United States Patent [19]

Uchimura

[11] Patent Number: 5,077,559
[45] Date of Patent: Dec. 31, 1991

[54] RADAR APPARATUS

[75] Inventor: Tsuyoshi Uchimura, Onojo, Japan

[73] Assignee: Matsushita Electric Industrial Co., Ltd., Osaka, Japan

[21] Appl. No.: 645,068

[22] Filed: Jan. 23, 1991

[30] Foreign Application Priority Data

Feb. 1, 1990 [JP] Japan .................................. 2-22434

[51] Int. Cl.⁵ .............................................. G01S 7/04
[52] U.S. Cl. ..................................... 342/176; 342/177
[58] Field of Search ................................ 342/176, 177

[56] References Cited

U.S. PATENT DOCUMENTS 3,899,769  8/1975  Honore et al. .................. 342/176 X
4,612,544  9/1986  Da Silva et al. .................... 342/176

FOREIGN PATENT DOCUMENTS 57-131082  8/1982  Japan .

Primary Examiner—Mark Hellner
Attorney, Agent, or Firm—Stevens, Davis, Miller & Mosher

[57] ABSTRACT

A radar apparatus of the present invention comprises an image preservation memory capable of preserving pixel data, preservation request means by which a user may request the preservation of the image, and read request means for requesting the readout of the image. When the preservation is requested by the preservation request means, the image at that moment is stored in the image preservation memory, and when the readout is requested by the readout request means, the image read from the image preservation memory is superimposed on the image at that moment so that the image at the moment of the request for preservation by the user is displayed concurrently on the same screen as that of the current image. Thus, the user can easily detect an error between the position of the transmitting station on the preserved screen and the current position and can move back a ship to the original position quickly and with a very small error.

3 Claims, 2 Drawing Sheets

RADAR APPARATUS

BACKGROUND OF THE INVENTION

The present invention relates to a radar apparatus.

In a conventional radar apparatus, an object around a transmitting station (for example, a ship) can be displayed on a screen. If the object is a fixed obstacle such as an island or land, a position of the transmitting station can be roughly measured based on a positional relationship between the fixed obstacle displayed on the radar apparatus and a transmitting point on the screen. As a method for measuring a position of a ship, LORAN, OMEGA and DECCA which utilize an electromagnetic wave emitted from a wireless station on a ground, and NNSS and GPS which utilize a satellite have been known.

However, in the measurement of the position of the ship by the conventional radar apparatus or LORAN, OMEGA or DECCA, the measurement data includes a relatively large error. Accordingly, if it is desired to move back the ship to a position which the ship has previously passed through, it is not actually possible to move back the ship to the exact position. In addition, since the position is digitally displayed, it is necessary to navigate the ship to the target point while tracing a locus on a chart. As a result, it takes a time to measure the position, and the determination of direction and distance of movement is delayed, and hence it takes a time to reach the target point. A special display device which can solve the above problems is available but it is very expensive and need an installation space.

And a device to superimpose a chart on a display disclosed by Tanaka in JP-A-57-131082 has an disadvantage for art, because it should bear image information of charts around any current location of the ship.

SUMMARY OF THE INVENTION

In the light of the above, it is an object of the present invention to provide a radar apparatus which allows to move back a ship to a position which the ship has previously passed through, quickly and very accurately.

The radar apparatus of the present invention comprises an image preservation memory capable of preserving at least one screen of pixel data, preservation request means by which a user may request the preservation of the image, and read request means for requesting the readout of the image. When the preservation is requested by the preservation request means, the image at that moment is stored in the image preservation memory, and when the readout is requested by the readout request means, the image read from the image preservation memory is superimposed on the image at that moment so that the image at the moment of the request for preservation by the user is displayed concurrently on the same screen as that of the current image. Thus, the user can easily detect an error between the position of the transmitting station or the preserved screen and the current position by merely watching the screen and can very easily detect a return to the same position. The user may move the ship with a fine control until the image preserved in the memory coincides with the current image so that the ship can reach the same position as that at which the image was preserved, quickly and with a very small error.

DESCRIPTION OF THE PREFERRED EMBODIMENTS

One embodiment of the present invention is now explained with reference to the drawings.

Figure 1:
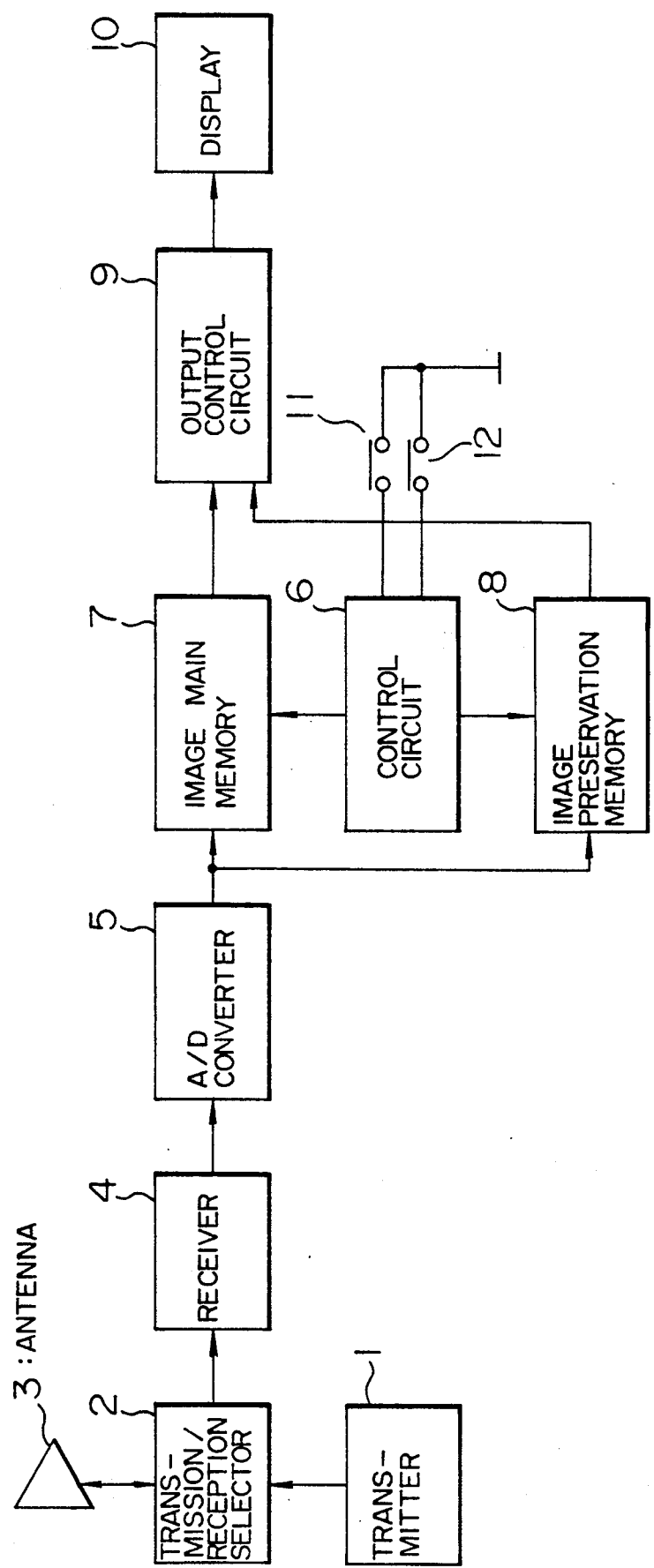
FIG. 1 shows a block diagram of a radar apparatus in accordance with an embodiment of the present invention.

In FIG. 1, numeral 1 denotes a transmitter which produces a pulse-modulated microwave. Numeral 2 denotes a transmission/reception selector. Numeral 3 denotes an antenna which radiates the microwave and receives an echo wave reflected by a target object. Numeral 4 denotes a receiver which amplifies a received signal sent from the antenna 3 and demodulates it to produce an image signal. Numeral 5 denotes an A/D converter which converts the analog signal supplied from the receiver 4 to a digital signal. Numeral 6 denotes a control circuit, numeral 7 denotes an image main memory which temporarily stores a current image signal, numeral 8 denotes an image preservation memory which stores an image signal at the moment when the preservation of image is requested, numeral 9 denotes an output control circuit, numeral 10 denotes a display having a CRT, numeral 11 denotes a preservation switch by which a user request the preservation of image, and numeral 12 denotes a display switch by which the user requests to display the preserved image.

An operation of the radar apparatus thus constructed is now explained.

A normal operation to detect a target object is first explained.

Figure 2A:
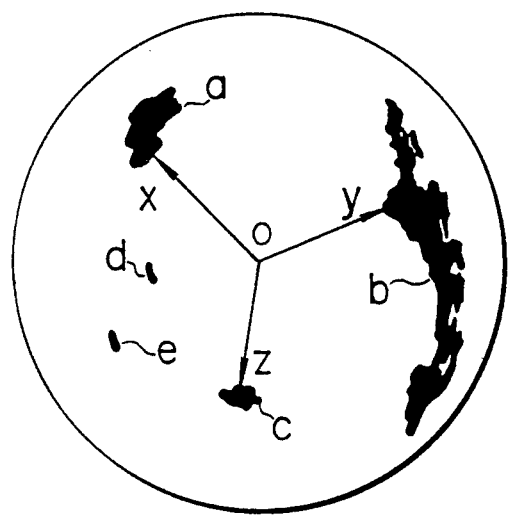
FIGS. 2A and 2B show display screens of the radar apparatus.

An RF current from the transmitter 1 is fed to the antenna 3 through the transmission/reception selector 2 and a microwave is emitted from the antenna 3. When the microwave hits a target object, it is reflected and redirected to the antenna 3. The signal is amplified and detected by the receiver 4 which produces an image signal. The image signal is converted from an analog signal to a digital signal by the A/D converter 5 so that digital pixel data is produced by the A/D converter 5 at each sampling period. The control circuit 6 prosecutes an address-conversion of the pixel data produced by the A/D converter 5 at each sampling period from a polar coordinate to an orthogonal coordinate and temporarily stores it in the image main memory 7. The pixel data stored in the image main memory 7 is read out by the control circuit 6 in synchronism with a deflection timing of the display 10, and it is D/A-converted by the output control circuit 9 and supplied to the display 10. FIG. 2A shows an example of a radar image displayed on the display 10.

An operation for storing the radar image at a certain time point (at the position of FIG. 2A in the present embodiment) is now explained. The user depresses the preservation switch 11 at a time point at which the image is to be preserved. This time point is hereinafter referred to as a preservation point. The control circuit 6 converts the received signal for the next one rotation of the antenna 3 to a digital form, address-converts it from the polar coordinate to the orthogonal coordinate, and stores it in the image preservation memory 8.

Figure 2B:
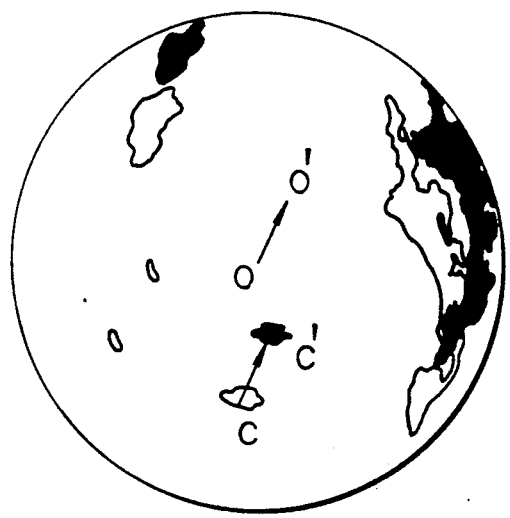

An operation to move the ship to the preservation point while the user watches the preserved radar image is now explained. When the user depresses the display switch 12, the control circuit 6 reads out the radar image stored in the image preservation memory 8 and supplies it to the output control circuit 9. The output control circuit 9 flashes that radar image on the display 10 supplied from the image preservation memory 8. During this period, the radiation of the microwave and the reception of the echo wave continue and the pixel data generated from the received signal is taken into the output control circuit 9 from the image main memory 7 so that the current radar image is displayed on the display 10. Thus, the radar image stored in the image preservation memory 8 and the current radar image are displayed in superposition on the display 10 as shown in FIG. 2B. Since the radar image read out from the image preservation memory 8 is flashed as described above, the user can easily identify it. A white image shown in FIG. 2B is the preserved image and a black image is the current image.

By watching the superimposed radar images, the user can recognize, at a first glance, a difference between the current position and the position at which the image was previously preserved. Thus, the user arrives at the preservation point, when the ship is moved such that the target object on the preserved radar image and the target object on the current radar image coincide. When the flashing radar image on the display screen coincides with the non-flashing radar image, the flashing disappears at the overlapped area. If both images completely coincide, the flashing of the image substantially disappears. Thus, when the flashing disappears, the user may determine that the ship has moved back to the original position or the preservation point. In the present embodiment, the user can easily determine the return of the ship to the original position by merely checking the disappearance of the flashing of the image.

For example, in FIG. 2B, it is seen that the ship is to be moved from O to a vicinity of O' based on a deviation between a portion C of the preserved image and a current image C' of the same object.

The present embodiment is particularly useful to a small ship with a relatively small range of movement such as a fishing boat. When it is desired to move the boat back to a place at which many fishes were previously fished, or move back to a place where nets or baskets were set and it is not possible to find a marking float because waves are high, the boat may be navigated by watching the display screen of the radar apparatus so that the boat is quickly and very accurately guided to the target point. A boatman can finely control the movement of the boat by steering the boat in a manner to eliminate the error between the image preserved in the memory and the current image while be watches the screen, and the boat can reach the same position at which the image was preserved, with a very small error.

The radar apparatus of the present invention may also be used in a marine survey boat.

In the present embodiment, the preserved image is flashed on the display 10 so that the user can distinguish the image preserved in the memory from the current image. Alternatively, the tonality or color of the preserved image may be changed from that of the current radar image.

In the embodiment, when the preservation switch 11 is depressed, the image data produced by the A/D converter 5 is stored in the image preservation memory. Alternatively, when the switch is depressed, the image data already stored in the main image memory may be stored into the image preservation memory.

By providing the image preservation memory with the capacity of plural images, it is possible to record images at plural points. With a back-up system of the image preservation memory in a magnetic disk, more effective utilization is attained.

By combining with a north-up function (a display system in which the north is fixed to zero degree azimuth) or a true motion function (in which a fixed image such as islands or land is fixedly displayed on the screen and an image of a moving object such as ships including the ship its self is displayed as they move), the position detection method by the radar apparatus of the present invention is rendered more effective.

I claim:

1. A radar apparatus comprising:

an antenna;

a transmitter for feeding an RF current to said antenna to transmit an electromagnetic wave;

a receiver for receiving the electromagnetic wave emitted from said antenna and reflected back by an obstacle and for generating pixel data which is a base of a display image from the received signal;

an image main memory for storing the pixel data supplied from said receiver;

a display for displaying images;

preservation request means for requesting the preservation of the pixel data;

an image preservation memory for storing the pixel data upon request by said preservation request means;

readout request means for requesting the readout of the pixel data of said image preservation memory; and output control means for superimposing the image generated from the pixel data stored in said image preservation memory on the image generated from the pixel data stored in said image main memory upon request by said readout request means and displaying the superimposed images on said display.

2. A radar apparatus comprising:

an antenna;

a transmitter for feeding an RF current to said antenna to transmit an electromagnetic wave;

a receiver for receiving the electromagnetic wave emitted from said antenna and reflected back by an obstacle and for generating pixel data which is a base of a display image from the received signal;

an image main memory for storing the pixel data supplied from said receiver;

a display for displaying images;

preservation request means for requesting the preservation of the pixel data;

an image preservation memory for storing the pixel data upon request by said preservation request means;

readout request means for requesting the readout of the pixel data of said image preservation memory; and output control means for superimposing the image generated from the pixel data stored in said image preservation memory on the image generated from the pixel data stored in said image main memory upon request by said readout request means and displaying the superimposed images on said display while flashing the image generated from the pixel data stored in said image preservation memory.

3. A radar apparatus comprising:

an antenna;

a transmitter for feeding an RF current to said antenna to transmit an electromagnetic wave;

a receiver for receiving the electromagnetic wave emitted from said antenna and reflected back by an obstacle and for generating pixel data which is a base of a display image from the received signal;

an image main memory for storing the pixel data supplied from said receiver;

a display for displaying images;

preservation request means for requesting the preservation of the pixel data;

a plurality of image preservation memories for storing the pixel data upon request by said preservation request means;

readout request means for requesting the readout of the pixel data of said image preservation memory; and output control means for superimposing the image generated from the pixel data stored in a selected one of said image preservation memories on the image generated from the pixel data stored in said image main memory upon request by said readout request means and displaying the superimposed images on said display.

* * * * *